United States Patent

Schneider

[11] Patent Number: 5,771,835
[45] Date of Patent: Jun. 30, 1998

[54] PASSIVE MARKER DEVICE FOR PARTICULAR POINTS, SUBSURFACE ITEMS AND CONDITIONS

[76] Inventor: Steven Alan Schneider, P.O. Box 2758, San Rafael, Calif. 94912-2758

[21] Appl. No.: 537,618
[22] Filed: Oct. 2, 1995
[51] Int. Cl.[6] ................................................. G01D 21/00
[52] U.S. Cl. .............................. 116/209; 52/103; 343/719
[58] Field of Search ................................... 116/204, 209; 52/103, 104, 105; 343/719; 33/1 H

[56] References Cited

U.S. PATENT DOCUMENTS

| | | |
|---|---|---|
| 1,004,188 | 9/1911 | Olds . |
| 3,115,861 | 12/1963 | Allen . |
| 3,282,057 | 11/1966 | Prosser . |
| 3,367,370 | 2/1968 | Sherlock . |
| 3,523,515 | 8/1970 | Brown ..................................... 116/209 |
| 3,633,533 | 1/1972 | Allen et al. . |
| 3,916,821 | 11/1975 | Pies ......................................... 116/209 |
| 3,927,637 | 12/1975 | Sammaritano . |
| 4,334,227 | 6/1982 | Marks . |
| 4,343,567 | 8/1982 | Sarver et al. . |
| 4,623,282 | 11/1986 | Allen . |
| 4,738,060 | 4/1988 | Marthaler . |
| 4,761,656 | 8/1988 | Cosman et al. . |
| 4,811,030 | 3/1989 | Pedersen . |
| 4,949,664 | 8/1990 | Wallace .................................. 116/209 |
| 4,991,536 | 2/1991 | Moshofsky .............................. 116/209 |
| 5,036,210 | 7/1991 | Goodman . |
| 5,056,454 | 10/1991 | Turner ..................................... 116/209 |
| 5,101,755 | 4/1992 | Barrett . |
| 5,467,729 | 11/1995 | Yamada et al. .......................... 116/209 |
| 5,568,785 | 10/1996 | Hazen ..................................... 116/209 |

*Primary Examiner*—William A. Cuchlinski, Jr.
*Assistant Examiner*—Andrew Hirschfeld

[57] ABSTRACT

A preferred embodiment of the invention includes a passive type marker device (10) with a stem (11) placed in contact with or adjacent to a hidden object (14) or other particular point, providing for visual and/or electronic identification of such. Measurements (20) and directional markings (24) imprinted along the stem face indicate distance to the object. An alignment saddle (12) astride the object self aligns an arrow opening (18) through the stem defines the object's orientation relative to its surroundings. The device's color indicates object type such as red for electric, blue for water, etc. A marker dial (46) for optional placement in a finished surface also defines the object depth. The dial is indexedly installed atop an alignment indicating adapter (44) which is self aligned by insertion into the arrow opening of the stem. An arrow and indicia atop the adapter indicates the orientation and size of the object. An electronically locatable tuned circuit is encased within the alignment indicating adapter. Alternately the stem, the dial with the adapter or the adapter alone may be placed in the vicinity of the hidden object or particular point without the other parts.

6 Claims, 3 Drawing Sheets

PASSIVE MARKER DEVICE FOR PARTICULAR POINTS, SUBSURFACE ITEMS AND CONDITIONS

FIELD OF THE INVENTION

The field of invention presented herein relates to passive marker devices which are selectively placed at particular points or relative to various portions of hidden utilities such as oil, gas, electric, communication, water, and effluent lines and valves; tanks, tunnels, vaults and equipment; areas of condition such as aquifers, mineral veins and contamination; for use in locating such positions, lines, items, and conditions when necessary.

BACKGROUND OF THE INVENTION

In many situations it is desirable to locate particular points; subsurface pipelines, cables or conditions, either to reference, monitor, service or repair them and to avoid inadvertent damage to them by intersecting or adjacent excavation, exploration or other activity. Much of the piping and other hidden objects used today is of plastic or other material without metallic assimilation, sheathing, casing or conductors.

Prior art marker devices for particular points or underground pipelines, cables, vaults and subsurface hidden objects and conditions are of passive or electronic means. There are also hybrid designs that combine both.

Electronic marker systems typically require markers with resonant circuits together with a transmitter and receiver all tuned to matching frequencies, which may then be interpreted to indicate the relative location of the hidden object. See: Marks, U.S. Pat. No. 4,334,227; Cosman and Cox, U.S. Pat. No. 4,761,656; and Pedersen, U.S. Pat. No. 4,811,030. Close proximity to the marker is required for the use of such systems. Identifications of the size, orientation and depth of the hidden object are limited or not ascertained. Maps, other record data or exploratory excavation would be required to discern the hidden object location and specifications.

Subsurface passive marker devices include colored tapes that are placed above the object prior to concealment so that in the event of excavation the tape will be exposed as warning, to prevent damage of the hidden object. See: Allen, U.S. Pat. No. 3,115,861, Prosser, U.S. Pat. No. 3,282,057; and Allen, U.S. Pat. No. 3,633,533. The device cannot be visually detected from above the concealing surface. If such was placed too close to the hidden object, drifted off course in backfilling or not recognized during work, an excavation operation may not have adequate warning of the location of the hidden object. Hybrid designs of such include metallic material within the tape providing for the means of electronic detection. See: Allen, U. S. Pat. No. 4,623,282. Additional hybrid designs include magnetic or metallic assimilation of or attachments to plastic conduits. See: Goodman, U.S. Pat. No. 5,036,210 and Sherlock, U.S. Pat. No. 3,367,370. If the foregoing materials are located by magnetic or conductive detecting methods, size and use of the hidden object are not readily identified and ascertainment of depth is limited to certain instruments.

Surface passive marking devices include monument plates, sign poles and stakes that are implanted above or adjacent the location of the hidden object, such as Olds, U. S. Pat. No. 1,004,188; Samrnaritano, U.S. Pat. No. 3,927,637; Sarver and Arthur, U.S. Pat. No. 4,343,567; Marthaler, U.S. Pat. No. 4,738,060, and Barrett, U.S. Pat. No. 5,101,755. Fidden object depth, size and orientation information may be absent, off course or incomplete with such devices. Data is sometimes painted upon the surface to delineate the position of the hidden object. Such locating is done utilizing maps and/or electronic locator instruments, preceding intended excavations. Object depth and size are usually not noted or identified. The marking may have been placed off course due to errors made in data recordation, mapping or locating efforts. Additionally, in time, the paint wears off or is covered over by resurfacing. Therefore, the marking placed may be invalid or no longer exist when utilities need to be located.

Current art is limited in the scope of identifying information it provides. Consequently, additional time and expense of researching more thorough data may be required in emergency, service or new work; such may not be expended or exist prior to the work. Thereby exists potential hazards and costs associated with property, environment and human casualty by the inadvertent damage of hidden objects.

SUMMARY OF THE INVENTION

An advantage of the present invention is to provide a visible and electronically detectable marker for designating particular points.

Another object of the invention is to provide a marker for designating specific locations of hidden objects.

Another object of the invention is to provide a marker that defines the center line distance of the hidden object from the concealing surface.

Another object of the invention is to provide a marker that defines the longitudinal alignment of the hidden object relative to the concealing surface.

Another object of the invention is to provide a marker that defines the size of the hidden object.

Another object of the invention is to provide a marker that defines the hidden object type.

These and other advantages are accomplished by the passive marker device of the invention which comprises an alignment saddle placed astride a hidden object. Upon the alignment saddle is mated a stem that projects to or beyond the concealing surface. The alignment saddle self aligns a pointer within the stem that indicates to a viewer above the concealing surface, the axial alignment of the hidden object. Indicia is imprinted along the face of the stem indicating the hidden object's distance from the concealing surface.

The stem is colored to represent particular utilities such as red for electric, blue for water, orange for communications, etc., or for particular points such as pink for temporary survey. Additionally the coloring usually provides a sufficient contrast with the in situs materials, enhancing its visibility.

The stem is finished flush with or beyond the concealing surface. When the finish of such is desired to be flush with a surface such as concrete or asphalt, a marker dial is alternately affixed at the stem end via an alignment adapter. The marker dial is imprinted with indicia further depicting the distance to the hidden object. In the case of the foregoing, a plate is inset into the top of the alignment adapter with indicia to indicate the size of the hidden object.

A tuned resonant circuit is embedded within the alignment adapter, to provide for electronic detection.

In accordance with the invention, the passive marker device is manufactured by common methods and materials and is easily installed without sophisticated instruction and special equipment.

While the foregoing is the preferred embodiment of my invention, further objects and advantages will become apparent from a consideration of the following drawings and ensuing descriptions.

DETAILED DESCRIPTION

Figure 1:
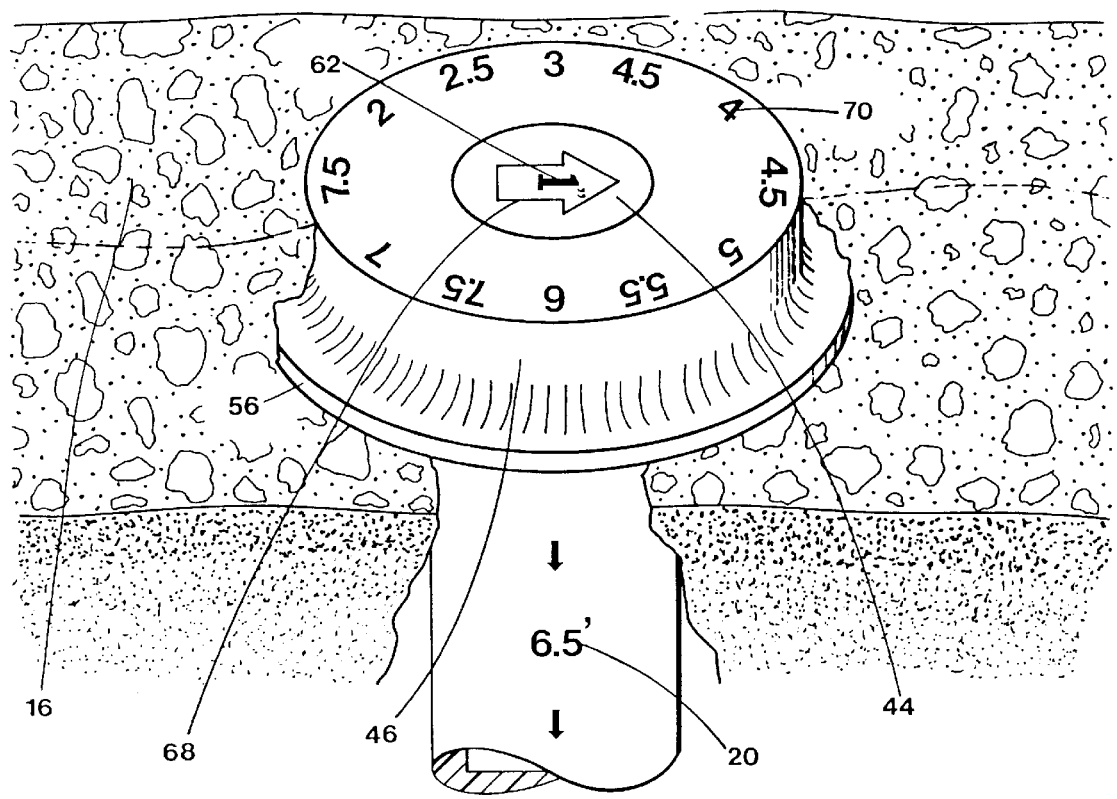
FIG. 1 is a perspective view of a passive marker device embodying the present invention, with certain materials broken away to illustrate the use of the device in placement with a hidden object.
Figure 1:
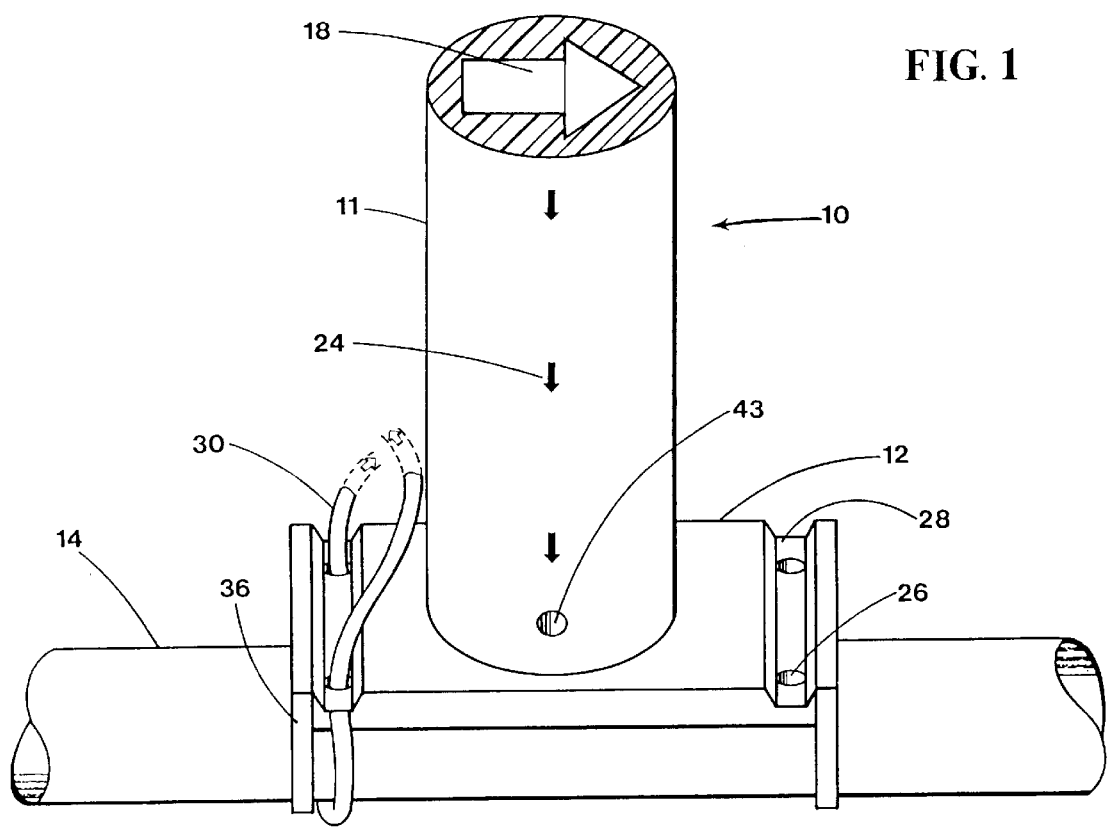
Figure 2:
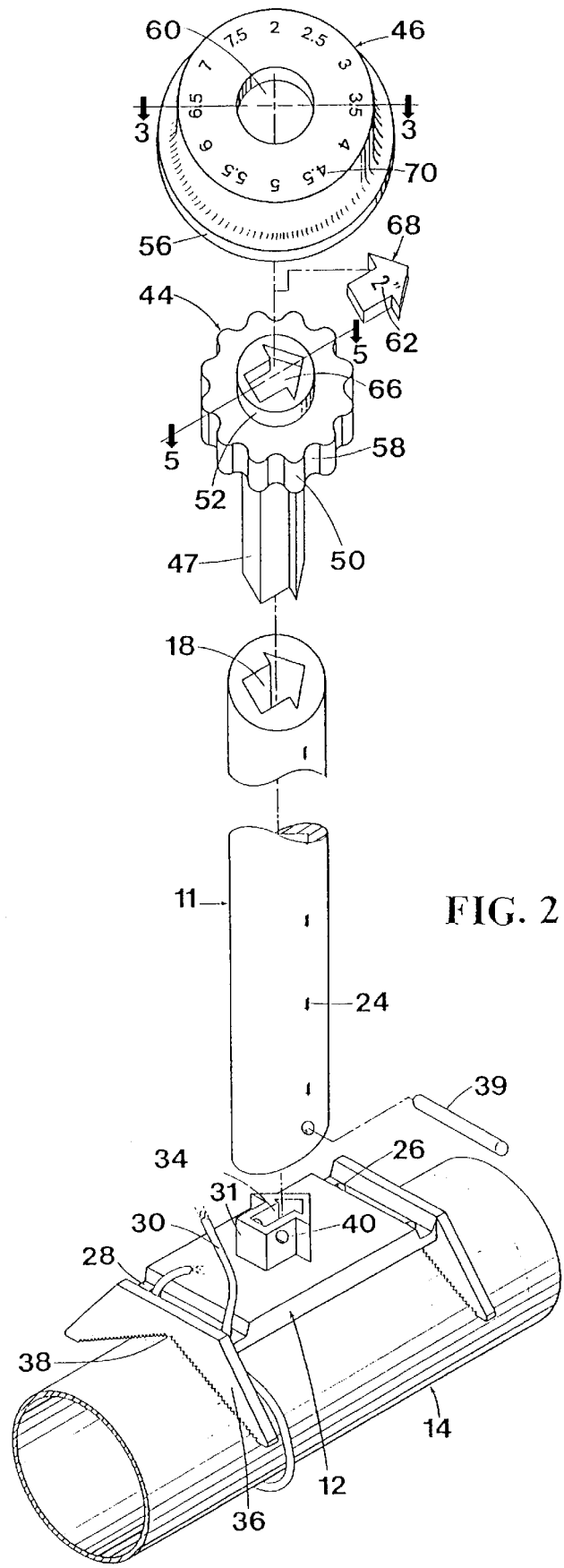
FIG. 2 is an exploded perspective view, of the passive marker device of FIG. 1.
Figure 3:
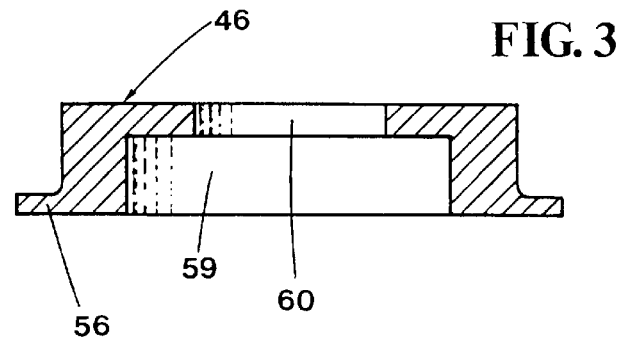
FIG. 3 is a sectional view taken along line 3—3; of the marker dial of FIG. 2.
Figure 4:
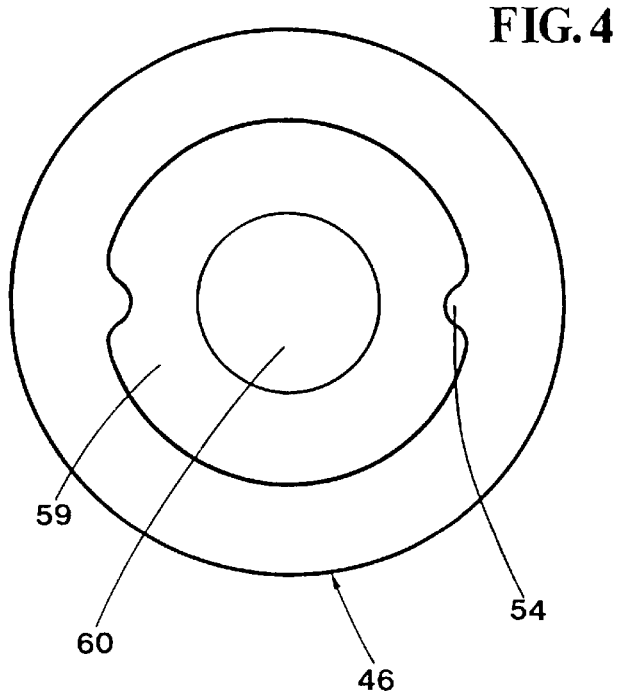
FIG. 4 is a bottom view of the marker dial of FIGS. 1, 2 and 3.

FIG. 1 is a perspective view of the passive marking device of the invention and referred to by the general reference character 10. The passive marking device 10 includes a stem 11 with an arrow opening 18 and indelibly imprinted with a plurality of depth measurements 20. The depth measurements 20 may be pursuant to and in conjunction with directional markings 24, to show the center line orientation and distance of a hidden object 14 from a concealing surface 16. A marker dial 46 with an array of indelibly imprinted object depth indicia 70 additionally indicates the foregoing. An object diameter and alignment insert 68 with an object diameter indicia 62 affixed into the top of an alignment adapter 44 indicates the hidden object 14 diameter or other dimension(s) of such. The object diameter and alignment insert 68 simultaneously points to the particular depth indicia 70 indexedly positioned to indicate the distance of the hidden object 14 from the concealing surface 16. An alignment saddle 12 astride the hidden object 14 in the same longitudinal axial plane as such provides an initiation of sequential self alignment for the stem 11, the alignment indicating adapter 44 and the concealed object diameter and alignment insert 68. A tie 30 lashes the passive marking device 10 to the hidden object 14. FIG. 2 shows an exploded perspective view of the sequential assembly of the passive marker device 10 showing the alignment saddle 12 astride and lashed to the hidden object 14, mating to the stem 11, mating to the alignment indicating adapter 44 together with the object diameter and alignment insert 68, mating to the marker dial 46. End plates 36 of the alignment saddle 12 position the long axis of such parallel with the longitudinal axial plane of the hidden object 14. The alignment saddle 12 contains two grooves 28 to channel and contain a lashing or lashings such as by cordage(s), wire(s) or plastic tie(s) 30 to cincture the passive marker device 10 to the hidden object 14. Each groove 28 contains two holes 26 to accept alternate passage of the tie(s) 30 through and over the foregoing. The alignment saddle 12 has centered upon it an arrow tongue 31 in directional orientation emulating the axis plane intersecting the vertexes 38 of the end plates 36. The arrow tongue 31 self aligns the arrow opening 18 of the stem 11 in the same longitudinal axial plane as the hidden object 14. A cincture hole 43 in the end of the stem 11 and an arrow tongue cincture hole 40 in the arrow tongue 31 of the alignment saddle 12 provide for passage of a tie 30 or a transferious pin 39 to lock the foregoing to each other. The adapter alignment tongue 47 of the alignment indicating adapter 44, following insertion into the arrow opening 18 of the stem 11, continues the copy transference of the longitudinal axial plane of the concealed object 14. A head 52 upon the indicating adapter 44 projects through a socket 60 of the marker dial 46 and finishes flush with the outer surface of such. An insert recess 66 within the head 52 points in the direction of the hidden object's 14 longitudinal axial plane.

The object diameter and alignment insert 68 with the diameter indicia 62, when set into the plate indent 66 of the alignment indicating adapter 44, shows the particular diameter of the hidden object 14 and further provides for identification of the longitudinal axial plane of such.

The outer face of the marker dial 46 has sufficient surface area to provide for imprinting of additional information such as the name of a utility company, a warning, etc.

Figure 5:
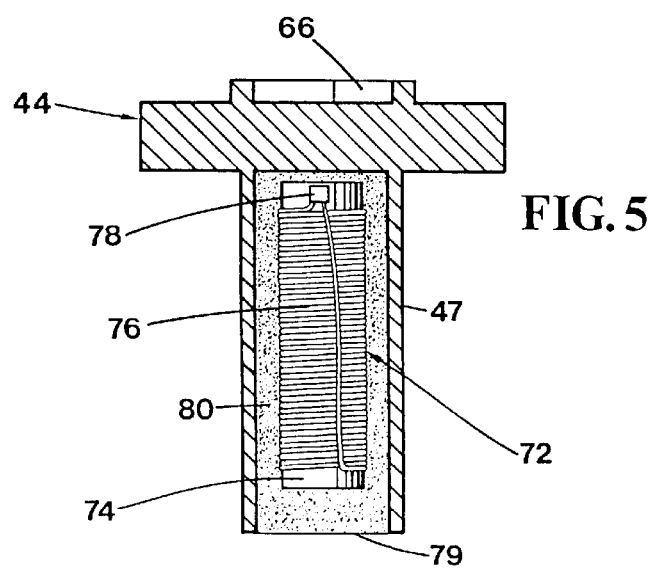
FIG. 5 is a sectional view taken along line 5—5 of FIG. 2.

FIG. 5 is a sectional view of the alignment indicating adapter 44. A tuned resonant circuit 72 is provided comprised of a ferrite slug 74 with conductive windings 76 and a capacitor 78. The tuned resonant circuit 72 is submersed into a cavity 79 within the adapter alignment tongue 47 and is secured and protected by a nonconductive and water resistant packing 80 material such as a silicone or an epoxy. The tuned resonant circuit 72 is resonated to particular frequencies typically employed to indicate the specific type of hidden object 14.

Sequential assembly and installation of the passive marker device 10 is accomplished by placing the alignment saddle 12 astride with both end plates 36 of such in positive contact with the hidden object 14, cincturing the alignment saddle 12 with cordage(s), wire(s), plastic or metal tie(s) 30 to the hidden object 14; mating the arrow opening 18 of the stem 11 onto the arrow tongue 31 of the alignment saddle 12; placing in situs materials to compose the concealing surface 16 around the stem 11 while retaining such by manual, temporary bracing or other means; cutting of the stem 11 flush with or at a desired elevation beyond the concealing surface 16, by utilization of knife, saw or other cutting means; inserting the adapter alignment tongue 47 of the alignment indicating adapter 44 into the arrow opening 18 of the stem 11; pressing the marker dial 24 onto the alignment indicating adapter 44. Connection of the marker dial 46 and the alignment indicating adapter 44 is preceded by indexedly positioning the object depth indicia 70 pertaining to the particular object to be marked in line with the arrow point of the plate recess 66 of the alignment indicating adapter 44. Following such, the alignment indicating adapter 44 is mated into a receptacle 59 of the marker dial 46; wherein lobes 54 enmesh, locking with cogs 50 and indents 58. Adjustment of the marker dial 46 against the elevation of the concealing surface 16 is made by telescopically raising or lowering the adapter alignment tongue 47 within the arrow opening 18 of the stem 11. The object diameter and alignment indicator plate 68 is inserted into the plate recess 66 of the alignment indicating adapter 44. The concealing surface 16 is placed around a retainer lip 56 of the marker dial 46 and is preferably finished flush with the outer surface of such. The retainer lip 56 when positioned beneath the concealing surface 16 of firm material secures the passive marker device 10 against tampering and other undesired uplift. Alternate assemblies and installation of the passive marker device 10 are comprised of the following:

(a) The stem 11 end may be finished beyond the concealing surface 16, without incorporation of the alignment indicating adapter 44 and marker dial 46. When such finish is preferred, the depth measurements 20 and direction markings 24 are visible on the exterior surface of the stem 11, indicating the center line distance to the hidden object 14. The object diameter and alignment insert 68 may be inserted into the end of the arrow opening 18 of the stem 11 to indicate the particular diameter size of the hidden object 14. A variation of this alternate assembly is comprised of the stem 11 finished flush with the concealing surface 16, whereby the end of the stem 11 and the arrow opening 18 or the object diameter and alignment insert 68 are visible from above the concealing surface 16.

(b) The passive marker device 10 may be comprised without incorporation of the alignment saddle 12, by placing the stem 11 in contact with or in immediate adjacency of the hidden object 14, rotating the stem 11 to position the arrow opening 18 of such in the same longitudinal axial plane as the hidden object 14 and continuing with the foregoing principal or alternate assemblies herein.

(c) The passive marker device 10 may be comprised of the marker dial 46 together with the alignment indicating adapter 44, without the stem 11 and alignment saddle 12. The marker dial 46 and alignment indicating adapter 44 may be installed upon or into the concealing surface 16 in the vicinity of the hidden object 14. The pointer of the insert recess 66 of the adapter 44 may be positioned in estimated alignment with the longitudinal axial plane of the hidden object 14. A variation of this form includes incorporation of the object diameter and alignment insert 68.

(d) The passive marker device 10 may be comprised solely of the alignment indicating adapter 44 set on to or in the vicinity of the hidden object 14 or installed upon or into the concealing surface 16. The insert recess 66 may be positioned in the same longitudinal axial plane as the hidden object 14. A variation of this form includes the incorporation of the object diameter and alignment insert 68.

The foregoing alternate forms of the passive marker device 10 may be utilized as markers at particular points without indicating a hidden object 14.

The arrow opening 18 of the stem 11 and the opening 34 of the arrow tongue 31 of the alignment saddle 12 additionally provides for temporary or permanent placement of conductors (not shown) from or to the hidden object 14 or an insertion of an instrument or tool (not shown) from beyond the in situ concealing surface 16 to the hidden object 14.

The stem 11 and the alignment indicating adapter 44 can be manufactured in a variety of colors associated with generally accepted industry standards so a selection can be made to indicate the particular hidden object 14 to be marked such as red-electrical, yellow-gas, orangecommunications, blue-water, green-sewer, etc., or for a particular point such as pink for temporary survey. The materials selected for the stem 11, the alignment saddle 12 and the alignment indicating adapter 44 should be water resistant, sufficiently flexible and not deteriorate in exposure to most manufactured materials, native earth's, natural light and weather. Any number of plastic materials are suitable, such as polyvinylchloride or polyethylene. The stem 11 may be produced by extrusion methods in a variety of lengths to suit particular placement requirements. The alignment saddle 12 and the alignment indicating adapter 44 may be produced by injection mold methods. The alignment saddle 12 may be produced in various sizes to accommodate particular diameters of hidden objects 14. Compatible ultraviolet light inhibitors may be assimilated into the plastic materials such as those stated herein to stop or retard deteriorating effects of the in situ environment. Metallic materials such as ferrite powder with nickel or reduced iron powder compatible with the plastic materials, such as those stated herein, may be assimilated within such to provide for conductivity or magnetic sensing recognition by locating instruments or marking systems. The marker dial 46 and the object diameter and alignment insert 68 may be of injection molded plastic or metals such as Z-mag or other alloys formulated with zinc, cast iron, bronze or stainless steel, produced by die cast or stamping methods.

While the outer peripheral configuration of the stem 11 is circular, and the arrow opening 18 is of arrow shape and open, it can be appreciated that other configurations and various sizes can be used; as can other configurations and various sizes for the alignment plate 12, the marker dial 46, the alignment indicating adapter 44 and the object diameter and alignment insert 68. It can be further appreciated that the indicias 20, 24, 70, and 62 imprinted upon or impressed into the foregoing may be substituted, omitted, and/or edited to other specifications; the color(s) of the stem 11, the alignment adapter 44 and the alignment saddle 12 may be changed to other specifications.

While there has been described in connection with the drawings what at present is considered to be the preferred embodiment of the invention, it will be understood that various modifications, such as those mentioned above, may be made therein and it is intended to cover in the appended claims all such modification as fall within the true spirit and scope of the invention.

I claim:

1. A passive marker device for indicating information concerning a hidden object positioned underneath a concealing surface, said passive marker device comprising:

a stem containing an arrow shaped opening throughout the length of said stem; and an alignment saddle mateable with a second end of the stem, said alignment saddle for orienting the stem relative to the hidden object, whereby said stem delineates the position of said hidden object when said stem is placed vertically upon the top surface of the hidden object, or in immediate adjacency of said hidden object, so that the first end of said stem is extended flush to or projected beyond the concealing surface.

2. The passive marker device in accordance with claim 1 wherein said saddle includes an arrow shaped tongue for mating with the arrow shaped opening of the stem at the second end of the stem, whereby said saddle and said arrow shaped tongue are arranged to provide self alignment of said stem relative to the hidden object.

3. The passive marker device in accordance with claim 1 wherein said passive marker device is manufactured in a predetermined color for providing at least some of said information.

4. The passive marker device in accordance with claim 1 wherein measurement indicia is printed upon the outer surface of said stem with said measurement indicia beginning with zero at the first end of said stem and continuing with divisions of said measurement indicia in a continuous manner throughout the length of said stem.

5. The passive marker device in accordance with claim 1 wherein said passive marker device is mated to a tuned resonant circuit.

6. The passive marker device in accordance with claim 1, further comprising:

a marker dial comprised of depth indicia imprinted on an upper face of said marker dial, a retainer lip at a base of said marker dial, a receptacle with lobes at the underside of said marker dial; and an alignment indicating adapter comprising an alignment adapter tongue of an arrow shape for mating with the arrow shaped opening of said stem at said first end, and a head attached to the adapter alignment tongue, said head having thereon cogs and indents for mating with said lobes, said head also having an insert recess of an arrow shape, wherein an object diameter and alignment indicator is within said insert recess.

* * * * *